(12) United States Patent
Hornby (10) Patent No.: US 11,681,065 B2
(45) Date of Patent: Jun. 20, 2023

(54) DEPTH-CONTINUOUS ESTIMATION OF THE ELASTIC TENSOR USING SINGLE DEPTH BOREHOLE SONIC MEASUREMENTS

(71) Applicant: Halliburton Energy Services, Inc., Houston, TX (US)

(72) Inventor: Brian Edward Hornby, Fulshear, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 348 days.

(21) Appl. No.: 16/792,425

(22) Filed: Feb. 17, 2020

(65) Prior Publication Data
US 2021/0255348 A1    Aug. 19, 2021

(51) Int. Cl.
*G01V 1/50* (2006.01)
*G01V 1/46* (2006.01)
(Continued)

(52) U.S. Cl.
CPC .............. *G01V 1/50* (2013.01); *E21B 49/00* (2013.01); *G01V 1/46* (2013.01); *G01V 99/005* (2013.01);
(Continued)

(58) Field of Classification Search
CPC .......... G01V 1/50; G01V 1/46; G01V 99/005; G01V 2210/121; G01V 2210/1299;
(Continued)

(56) References Cited

U.S. PATENT DOCUMENTS 8,243,549 B2 * 8/2012 Sayers ................... G01V 1/30
702/14
9,213,122 B2   12/2015 Horne et al.
(Continued)

FOREIGN PATENT DOCUMENTS

WO    03-076967    9/2003

OTHER PUBLICATIONS

Sinha, Estimation of rock anisotropic constant using sonic data deviated wellbores, IEEE. (Year: 2011).*
(Continued)

*Primary Examiner* — Mohammad K Islam
(74) *Attorney, Agent, or Firm* — John Wustenberg; C. Tumey Law Group PLLC (57) ABSTRACT

A method and system for estimating a full elastic tensor. The method may comprise taking a measurement for compressional wave sonic data and cross-dipole shear data with a sonic logging tool at a first location as cross-dipole data, processing the compressional wave sonic data to produce a compressional wave slowness (P), and processing the cross-dipole shear data to produce a fast horizontal polarized shear wave slowness (SH) and a slow quazi-vertical shear wave slowness (qSV) as a function of depth. The method may further comprise setting an initial guess for at least five constants of the full elastic tensor for Vertical Transversely Isotropy (VTI) symmetry, determining a modeled slowness surfaces from the full elastic tensor, and comparing the modeled slowness surfaces with measured values of the P, the SH, and the qSV. The method may be performed by a system comprising a sonic logging tool and an information handling system.

18 Claims, 7 Drawing Sheets

(51) Int. Cl.
*G01V 99/00* (2009.01)
*E21B 49/00* (2006.01)

(52) U.S. Cl.
CPC .............. *G01V 2210/121* (2013.01); *G01V 2210/1299* (2013.01); *G01V 2210/1429* (2013.01); *G01V 2210/62* (2013.01)

(58) Field of Classification Search
CPC ....... G01V 2210/1429; G01V 2210/62; G01V 1/284; G01V 1/305; G01V 2210/6242; G01V 2210/626; E21B 49/00
See application file for complete search history.

(56) References Cited

U.S. PATENT DOCUMENTS

| | | | |
|---|---|---|---|
| 2003/0167835 A1* | 9/2003 | Sinha | G01V 1/48 73/152.16 |
| 2009/0210160 A1* | 8/2009 | Suarez-Rivera | G01V 99/00 702/6 |
| 2010/0034052 A1 | 2/2010 | Pabon et al. | |
| 2012/0250459 A1* | 10/2012 | Sil | G01V 1/20 367/35 |
| 2014/0222346 A1 | 8/2014 | Collins et al. | |
| 2015/0012251 A1* | 1/2015 | Horne | E21B 41/0092 703/2 |
| 2017/0115422 A1 | 4/2017 | Kitazawa et al. | |
| 2019/0293815 A1 | 9/2019 | Jocker et al. | |
| 2019/0346581 A1* | 11/2019 | Boyd | G01V 1/303 |

OTHER PUBLICATIONS

Zhu, Sonic logging in deviated boreholes penetrating an anisotropic formation, seg (Year: 2007).*
Wang et al., Full-frequency inversion for simultaneous estimation of VTI anisotropy, formation shear slowness, and drilling fluid slowness using borehole sonic data. (Year: 2017).*
Hornby, B. E., Howie, J. M., and Ince, D. W., 2003a, Anisotropy correction for deviated well sonic logs: Application to seismic well tie: Geophysics, 68, No. 2, 464-471.
Quirein, J., Eid, M., and Cheng, A. 2014. Predicting the Stiffness Tensor of a Transversely Isotropic Medium When the Vertical Poisson's Ratio is Less Than the Horizontal Poisson's Ratio. Presented at the SPWLA 55th Annual Logging Symposium, Abu Dhabi, United Arab Emirates, May 18-22. SPWLA-2014-OOOO.
Schoenberg, M., Muir, F., and Sayers, C. 1996. Introducing ANNIE, a simple three-parameter anisotropic velocity model for shales. J Seism Explor 5 (1): 35-50.
Hornby, B.E., Wang, X., Dodds, K., 2003b, Do We Measure Phase or Group Velocity with Dipole Sonic Tools?, EAGE annual meeting, Stavanger.
Hornby, B. E., 1998, Experimental laboratory determination of the dynamic elastic properties of wet, drained shales: J. Geophys. Res., 103, 29,945-29,964.
Wireline, Petroleum Geomechanics services (e.g. Mechprop).
Wireline, Vertical Transverse Isotropy (VTI) Anisotropy Analysis.
Wireline, Crossed-Dipole (HTI) Anisotropy Analysis.
International Search Report and Written Opinion for Application No. PCT/US2020/019752, dated Nov. 10, 2020.

* cited by examiner

DEPTH-CONTINUOUS ESTIMATION OF THE ELASTIC TENSOR USING SINGLE DEPTH BOREHOLE SONIC MEASUREMENTS

BACKGROUND

Wellbores drilled into subterranean formations may enable recovery of desirable fluids (e.g., hydrocarbons) using a number of different techniques. A logging tool may be employed in subterranean operations to determine wellbore and/or formation properties. Formation evaluation further from a wellbore is a critical step in reservoir characterization and monitoring.

Formation parameters of interest that may resolve elastic anisotropy in a deviated wellbore may be useful. These parameters may be derived from sonic data measurements found using a sonic logging tool. A full elastic tensor may allow for equivalent vertical slowness of compressional primary longitudinal waves ("P waves") and shear secondary transverse waves ("S waves") to be computed, which may be used for petrophysics and standard derivation of seismic synthetics. P waves alternate in compressions and dilations in the same direction as the wave is propagating. S waves are alternating transverse motions perpendicular to the direction of propagation. In addition, the reference logs in the vertical direction will compare with reservoir logs in the field. A full elastic tensor may enable more accurate geomechanics results and may be used to estimate anisotropic seismic velocity models such as a Vertical Transverse Isotropy (VTI) model for use with pre-stack depth migration. Currently, a full elastic tensor can only be estimated either using multiple measurements using the sonic logging tool at multiple depths or processing sonic data acquired in multiple boreholes in the same formation. Additionally, the measurements must include multiple well angles with specific wellbore parameters.

BRIEF DESCRIPTION OF THE DRAWINGS

These drawings illustrate certain aspects of some examples of the present disclosure and should not be used to limit or define the disclosure.

DETAILED DESCRIPTION

The present disclosure relates generally to estimating a full elastic tensor using monopole and cross-dipole slowness measurements using data acquired in a deviated wellbore. Specifically, determining a full elastic tensor of five constants from three measurements at one measurement location. The five constants may be fed into anisotropic Geomechanics solutions and seismic anisotropy velocity model calibration at the wellbore, for use in calibrating large scale seismic velocity models. In addition, knowledge of the full elastic tensor enables correction of measured slownesses to deliver slowness equivalent to true vertical in the earth. This result is then used for comparison of vertical wells in the reservoir, as well as providing relevant vertical velocities for use in seismic well-tie and vertical velocity calibration.

Figure 1:
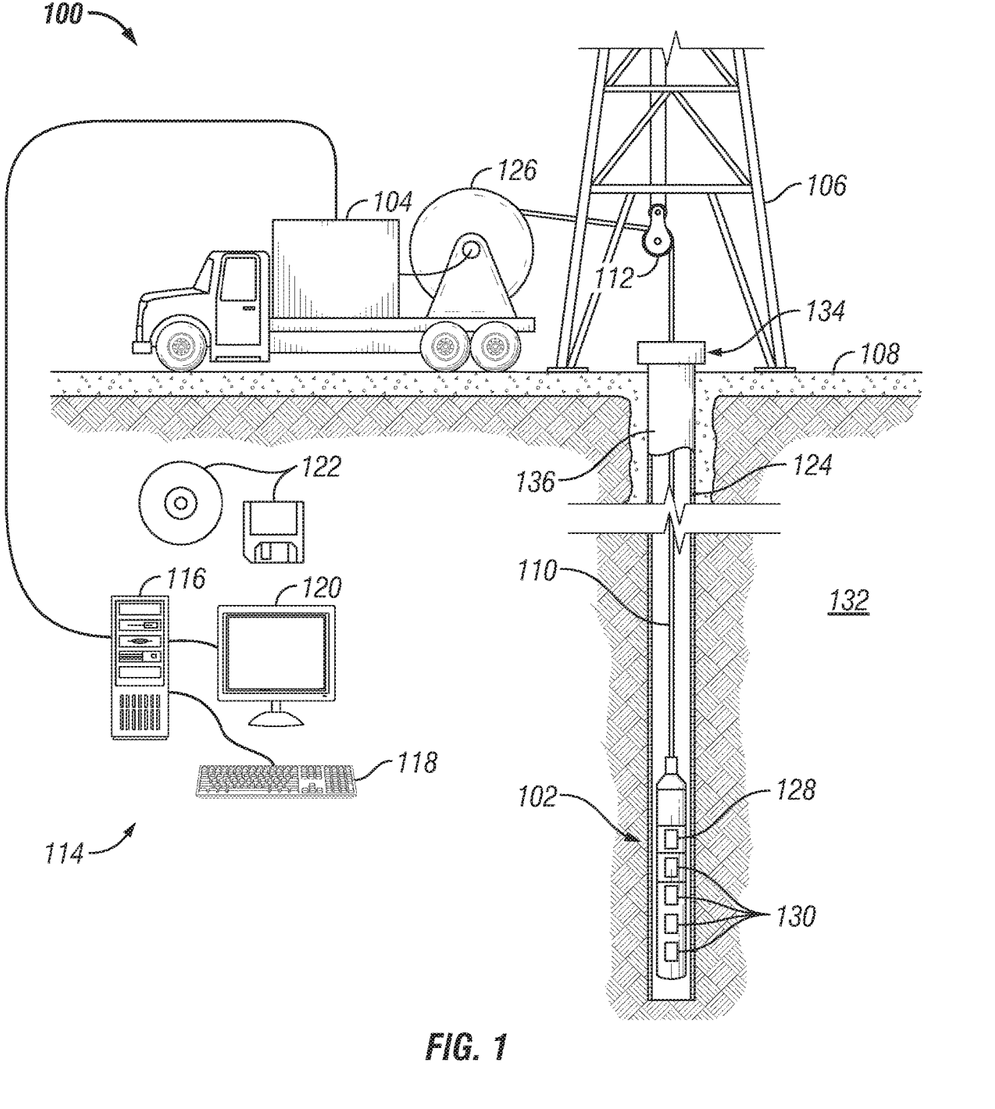
FIG. 1 illustrate an example of a borehole sonic logging system.

FIG. 1 illustrates a cross-sectional view of a sonic logging system 100. As illustrated, sonic logging system 100 may comprise a sonic logging tool 102 attached to a vehicle 104. In examples, it should be noted that sonic logging tool 102 may not be attached to a vehicle 104. Sonic logging tool 102 may be supported by rig 106 at surface 108. Sonic logging tool 102 may be tethered to vehicle 104 through conveyance 110. Conveyance 110 may be disposed around one or more sheave wheels 112 to vehicle 104. Conveyance 110 may include any suitable means for providing mechanical conveyance for sonic logging tool 102, including, but not limited to, wireline, slickline, coiled tubing, pipe, drill pipe, downhole tractor, or the like. In some embodiments, conveyance 110 may provide mechanical suspension, as well as electrical connectivity, for sonic logging tool 102. Conveyance 110 may comprise, in some instances, a plurality of electrical conductors extending from vehicle 104. Conveyance 110 may comprise an inner core of seven electrical conductors covered by an insulating wrap. An inner and outer steel armor sheath may be wrapped in a helix in opposite directions around the conductors. The electrical conductors may be used for communicating power and telemetry between vehicle 104 and sonic logging tool 102. Information from sonic logging tool 102 may be gathered and/or processed by information handling system 114. For example, signals recorded by sonic logging tool 102 may be stored on memory and then processed by sonic logging tool 102. The processing may be performed real-time during data acquisition or after recovery of sonic logging tool 102. Processing may alternatively occur downhole or may occur both downhole and at surface. In some embodiments, signals recorded by sonic logging tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to sonic logging tool 102.

Systems and methods of the present disclosure may be implemented, at least in part, with information handling system 114. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as various input and output (I/O) devices, such as an input device 118 (e.g., keyboard, mouse, etc.) and a video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

As illustrated, sonic logging tool 102 may be disposed in wellbore 124 by way of conveyance 110. Wellbore 124 may extend from a wellhead 134 into a formation 132 from surface 108. Generally, wellbore 124 may include horizontal, vertical, slanted, curved, and other types of wellbore geometries and orientations. Wellbore 124 may be cased or uncased. In examples, wellbore 124 may comprise a metallic material, such as tubular 136. By way of example, the tubular 136 may be a casing, liner, tubing, or other elongated steel tubular disposed in wellbore 124. As illustrated, wellbore 124 may extend through formation 132. Wellbore 124 may extend generally vertically into the formation 132. However, wellbore 124 may extend at an angle through formation 132, such as horizontal and slanted wellbores. For example, although wellbore 124 is illustrated as a vertical or low inclination angle well, high inclination angle or horizontal placement of the well and equipment may be possible. It should further be noted that while wellbore 124 is generally depicted as a land-based operation, those skilled in the art may recognize that the principles described herein are equally applicable to subsea operations that employ floating or sea-based platforms and rigs, without departing from the scope of the disclosure.

In examples, rig 106 includes a load cell (not shown) which may determine the amount of pull on conveyance 110 at surface 108 of wellbore 124. While not shown, a safety valve may control the hydraulic pressure that drives drum 126 on vehicle 104 which may reel up and/or release conveyance 110 which may move sonic logging tool 102 up and/or down wellbore 124. The safety valve may be adjusted to a pressure such that drum 126 may only impart a small amount of tension to conveyance 110 over and above the tension necessary to retrieve conveyance 110 and/or sonic logging tool 102 from wellbore 124. The safety valve is typically set a few hundred pounds above the amount of desired safe pull on conveyance 110 such that once that limit is exceeded; further pull on conveyance 110 may be prevented.

In examples, sonic logging tool 102 may operate with additional equipment (not illustrated) on surface 108 and/or disposed in a separate borehole sonic logging system (not illustrated) to record measurements and/or values from formation 132. Sonic logging tool 102 may comprise a transmitter 128. Transmitter 128 may be connected to information handling system 114, which may further control the operation of transmitter 128. Transmitter 128 may include any suitable transmitter for generating sound waves that travel into formation 132, including, but not limited to, piezoelectric transmitters. Transmitter 128 may be a monopole source or a multi-pole source (e.g., a dipole source). Combinations of different types of transmitters may also be used. During operations, transmitter 128 may broadcast sound waves from sonic logging tool 102 that travel into formation 132. The sound waves may be emitted at any suitable frequency range. For example, a broad band response could be from about 0.2 kHz to about 20 kHz, and a narrow band response could be from about 1 kHz to about 6 kHz. It should be understood that the present technique should not be limited to these frequency ranges. Rather, the sounds waves may be emitted at any suitable frequency for a particular application.

Sonic logging tool 102 may also include a receiver 130. As illustrated, there may be a plurality of receivers 130 disposed on sonic logging tool 102. Receiver 130 may include any suitable receiver for receiving sound waves, including, but not limited to, piezoelectric receivers. For example, the receiver 130 may be a monopole receiver or multi-pole receiver (e.g., a dipole receiver). In examples, a monopole receiver 130 may be used to record compressional-wave (P-wave) signals, while the multi-pole receiver 130 may be used to record shear-wave (S-wave) signals. Receiver 130 may measure and/or record sound waves broadcast from transmitter 128 as received signals. The sound waves received at receiver 130 may include both direct waves that traveled along the wellbore 124 and refract through formation 132 as well as waves that traveled through formation 132 and reflect off of near-borehole bedding and propagate back to the borehole. The reflected waves may include, but are not limited to, compressional (P) waves and shear (S) waves. By way of example, the received signal may be recorded as an acoustic amplitude as a function of time. Information handling system 114 may control the operation of receiver 130. The measured sound waves may be transferred to information handling system 114 for further processing. In examples, there may be any suitable number of transmitters 128 and/or receivers 130, which may be controlled by information handling system 114. Information and/or measurements may be processed further by information handling system 114 to determine properties of wellbore 124, fluids, and/or formation 132. By way of example, the sound waves may be processed to generate a reflection image of formation structures, which may be used for dip analysis as discussed in more detail below.

Figure 2:
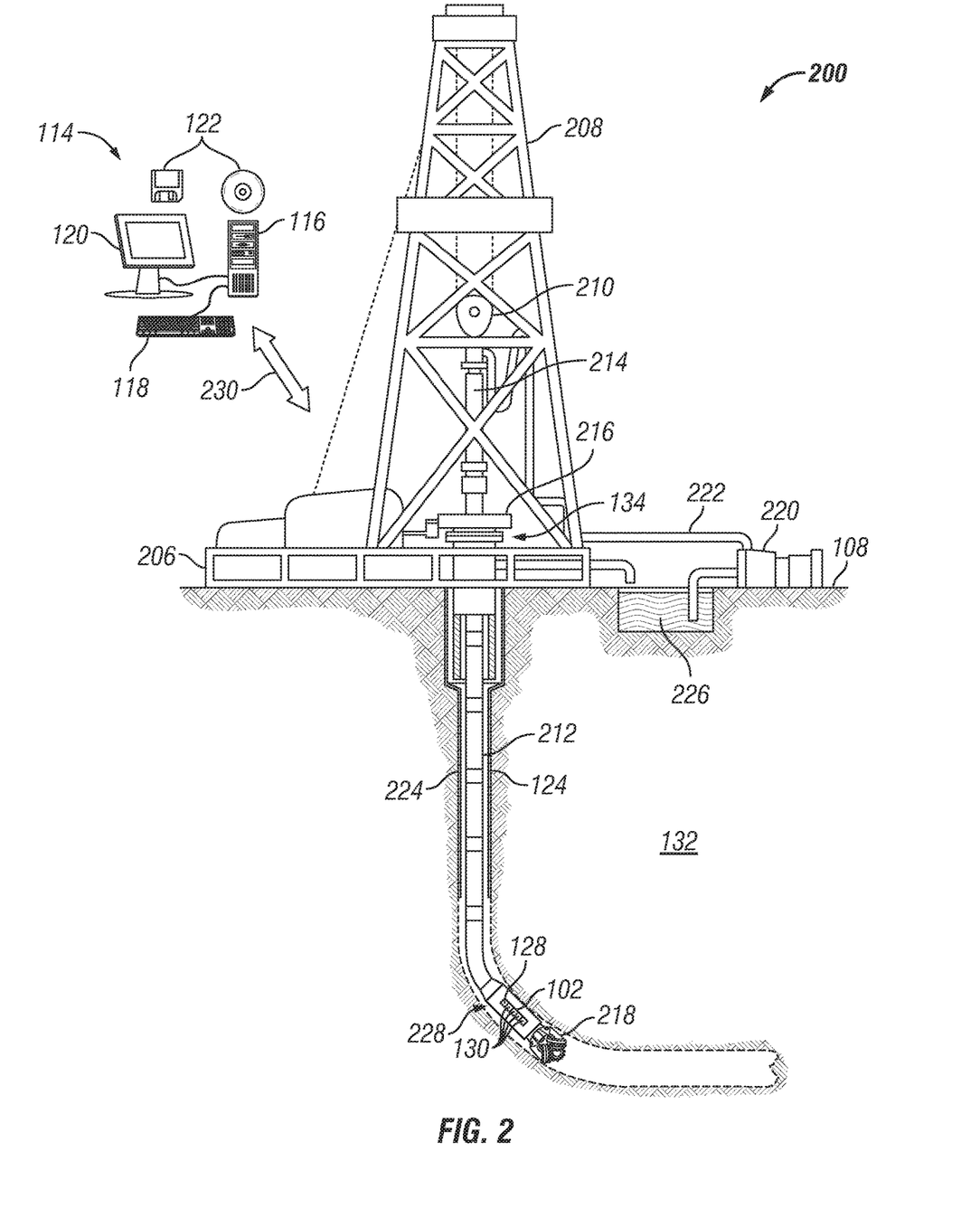
FIG. 2 illustrates an example of a drilling system.

FIG. 2 illustrates an example in which sonic logging tool 102 may be included in a drilling system 200. As illustrated, wellbore 124 may extend from wellhead 134 into formation 132 from surface 108. A drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 108. Without limitation, drill bit 218 may include, roller cone bits, PDC bits, natural diamond bits, any hole openers, reamers, coring bits, and the like. As drill bit 218 rotates, it may create and extend wellbore 124 that penetrates various subterranean formations 204. A pump 220 may circulate drilling fluid through a feed pipe 222 to kelly 214, downhole through interior of drill string 212, through orifices in drill bit 218, back to surface 108 via annulus 224 surrounding drill string 212, and into a retention pit 226.

With continued reference to FIG. 2, drill string 212 may begin at wellhead 134 and may traverse wellbore 124. Drill bit 218 may be attached to a distal end of drill string 212 and may be driven, for example, either by a downhole motor and/or via rotation of drill string 212 from surface 108. Drill bit 218 may be a part of bottom hole assembly (BHA) 228 at distal end of drill string 212. BHA 228 may further comprise sonic logging tool 102. Sonic logging tool 102 may be disposed on the outside and/or within BHA 228. Sonic logging tool 102 may comprise a plurality of transmitters 128 and/or receivers 130. Sonic logging tool 102 and/or the plurality of transmitters 128 and receivers 130 may operate and/or function as described above. As will be appreciated by those of ordinary skill in the art, BHA 228 may be a measurement-while drilling (MWD) and/or logging-while-drilling (LWD) system.

Without limitation, BHA 228, transmitter 128, and/or receiver 130 may be connected to and/or controlled by information handling system 114, which may be disposed on surface 108. Without limitation, information handling system 114 may be disposed down hole in BHA 228. Processing of information recorded may occur down hole and/or on surface 108. Processing occurring downhole may be transmitted to surface 108 to be recorded, observed, and/or further analyzed. Additionally, information recorded on information handling system 114 that may be disposed down hole may be stored until BHA 228 may be brought to surface 108. In examples, information handling system 114 may communicate with BHA 228 through a communication line (not illustrated) disposed in (or on) drill string 212. In examples, wireless communication may be used to transmit information back and forth between information handling system 114 and BHA 228. Information handling system 114 may transmit information to BHA 228 and may receive, as well as process, information recorded by BHA 228. While not illustrated, the drilling system 200 may include one or more downhole information handling systems. The one or more downhole information handling systems may include, without limitation, a microprocessor or other suitable circuitry, for estimating, receiving and processing signals from BHA 228. Such downhole information handling systems may further include additional components, such as memory, input/output devices, interfaces, and the like. While not illustrated, BHA 228 may include one or more additional components, such as analog-to-digital converter, filter and amplifier, among others, that may be used to process the measurements of BHA 228 before they may be transmitted to surface 108. Alternatively, raw measurements from BHA 228 may be transmitted to surface 108.

Any suitable technique may be used for transmitting signals from BHA 228 to surface 108, including, but not limited to, wired pipe telemetry, mud-pulse telemetry, acoustic telemetry, and electromagnetic telemetry. While not illustrated, BHA 228 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 230, which may be a wired or wireless link. The telemetry data may be analyzed and processed by information handling system 114.

As illustrated, communication link 230 (which may be wired or wireless, for example) may be provided which may transmit data from bottom hole assembly 228 to an information handling system 114 at surface 108. Information handling system 114 may include a processing unit 116, a video display 120, an input device 118 (e.g., keyboard, mouse, etc.), and/or non-transitory computer-readable media 122 (e.g., optical disks, magnetic disks) that may store code representative of the methods described herein. In addition to, or in place of processing at surface 108, processing may occur downhole.

Measurements taken by sonic logging tool 102 (e.g., referring to FIG. 1 or 2) may be analyzed to estimate the full elastic tensor (five constants) for VTI material as a function of depth. As discussed below, the five constants may be found using only data collected in a wellbore 124 (e.g., referring to FIGS. 1 and 2) and at single depth stations. To identify each of the five constants, measurements from sonic logging tool 102 are analyzed to produce required inputs used to invert for the five constants of the full elastic tensor. For example, wellbores 124 may penetrate anisotropic shales where the bedding has a relative dip more or less more than 30 degrees. In this case shear waves may split, resulting in separate SH and qSV shear modes that may have a different slowness, depending on the actual elastic anisotropy of the shale beds.

Figure 3:
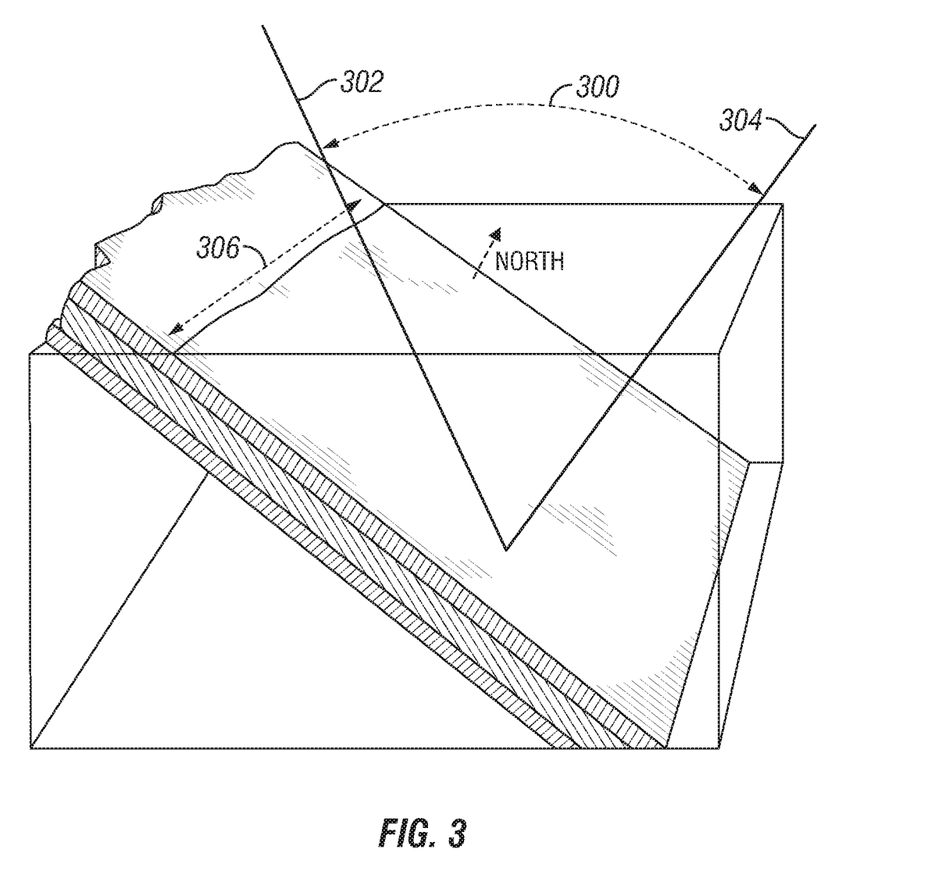
FIG. 3 illustrates an example of determining dip in a wellbore.

For reference, FIG. 3 illustrates relative dip 300 and how it is found. Relative dip 300 is defined as the angle between a borehole axis 302 and a line 304 perpendicular to a bedding plane 306 penetrated by the borehole and measured in each common plane. Relative dip 300 may be caused by bedding dip, well deviation, or a combination of the two. Practically, borehole deviation and direction relative to North are determined by a borehole inclinometer device, either acquired while drilling or with wireline deployed devices. Then actual bedding dip and direction are determined by other measurements, most commonly borehole image log analysis. Relative dip is then determined geometrically by the angle between the borehole axis and the line perpendicular to the bedding plane.

Figure 4:
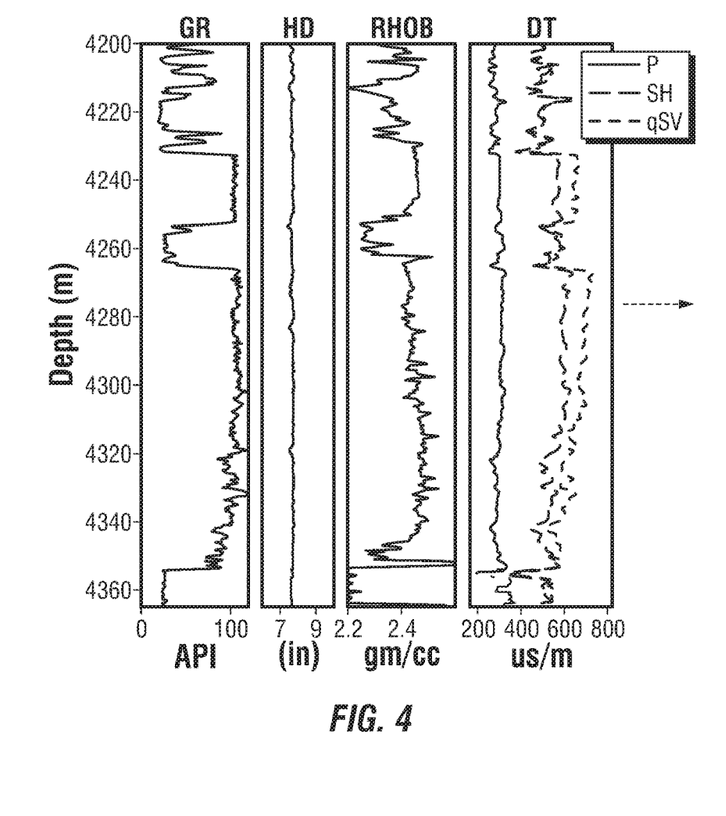
FIG. 4 illustrates measured data in a deviated well penetrating anisotropic shale.
Figure 5:
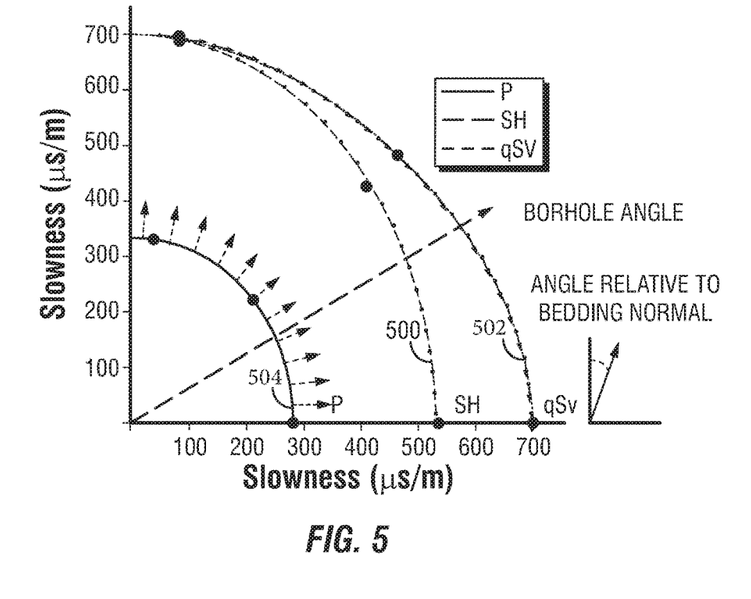
FIG. 5 illustrates slowness surfaces derived from core measurements.

FIG. 4 shows measured P-wave and rotated shear modes using 4-component rotation using sonic logging tool 102 (e.g., referring to FIG. 1 or 2). Here the process minimizes cross-component energy and rotates data to the split shear waves, fast shear (SH mode), and slow shear (qSV mode). As illustrated in FIG. 5, SH mode is identified as curve 500 in the graph. As curve 500 has a slowness just above 500 μs/m, curve 500 is defined as the fast shear. Curve 502 is defined as the slow shear because curve 502 has a slowness of 700 μs/m, which is slower than 500 μs/m of curve 500. Additionally, FIG. 5 illustrates a P-wave, which is identified as curve 504, which has a slowness just below 300 μs/m.

As discussed above, FIG. 5 illustrates a graph of the wave modes as a function of slowness. As illustrated, the wave modes may propagate at any suitable angle in the earth as a result of the elastic properties of formation 132 (e.g., referring to FIG. 1). In examples, the phase slowness and polarization for compressional (P) (i.e., curve 504), horizontally polarized shear (SH) (i.e., curve 500), and quazi-vertical shear (qSV) (i.e., curve 502) modes may be depicted. Measurements in wellbore 124 (e.g., referring to FIG. 1) may produce slowness logs at the relative dip angle through a slowness surface (a point on the surface at the relative dip, or angle relative to the normal plane of formation 132). In examples, the "in the plane" SH mode may be the fastest shear mode while "against the grain" qSV mode may be the slowest. SH mode polarization (depicted as dots indicating out of page polarization) may point to the strike direction, which is orthogonal to the direction of dip. Referring back to FIG. 4, a spread between the SH shear slowness and the qSV shear slowness over the anisotropic shale intervals (high gamma-ray, ~100+/−API) is shown. This demonstrates a physical effect that may be utilized to identify all five constants of the full elastic tensor from measurements obtained at a single depth. This spread between the SH shear slowness and the qSV shear slowness is a reaction to the elastic anisotropy, and may be used, with other data and approximations, to estimate the elastic anisotropy.

Using the measurements taken by sonic logging tool 102, as depicted in FIG. 5, personnel may compute the slowness surfaces in any angle in subterranean formation 132 (e.g., referring to FIG. 3) using a full elastic tensor and applying the Christoffel equations. The Christoffel equation in general may be shown as:

$$\det(\rho v^2 \delta_{ik} - \Gamma_{ik}) = 0 \tag{1}$$

where $\delta$ is bulk density, $v$ is phase velocity, $F$ is the Christoffel stiffness tensor, $$\Gamma_{ik} = c_{inkl} n_j n_l \tag{2}$$

and $\delta$ is a Kronecker delta function. Solving this expression (and taking the positive root) for propagation along the axes determine four of the five elastic stiffnesses:

$$C_{11} = \rho V_{PH}^2 \tag{3}$$

$$C_{33} = \rho V_{PV}^2 \tag{4}$$

$$C_{66} = \rho V_{SH}^2 \tag{5}$$

and $$C_{44} = \rho V_{SV}^2 \tag{6}$$

To solve for $C_{13}$ using a measurement of compressional or shear wave velocity at any off-axis angle, one solves Equation (1) for $C_{13}$, after forming the Christoffel stiffness tensor $\Gamma$ with the appropriate direction cosines for the angles of propagation used. For propagation at 45 degrees, the solution simplifies to:

$$C_{13} = -C_{44} + m\sqrt{(C_{11} + C_{44} - 2\rho C_{45}^2)(C_{33} + C_{44} - 2\rho C_{45}^2)} \tag{7}$$

where $V_{45}$ is a compressional (qP) or shear (qSV) wave velocity measurement taken at an angle of 45 degrees relative to the axis of symmetry, $m = -1$ for qP velocity measurement and $m = 1$ for qSV velocity measurement.

As illustrated in FIG. 3, for shale beds oriented horizontally in formation 132, vertical on the plot would be parallel to the vertical axis of symmetry and showing expected measurements for a vertical well. Referring to FIG. 5, curve 500 drawn at other angles will intersect the expected response for that well angle in formation 132, which as illustrated in FIG. 5, is an angle of about 50 degrees.

To determine a full elastic tensor for VTI symmetry, the five independent elastic constants are required. The elastic stiffness tensor may be written in the Voigt (two index) notation in the following 6×6 form:

$$C = \begin{pmatrix} C_{11} & C_{12} & C_{13} & & & \\ C_{12} & C_{11} & C_{13} & & & \\ C_{13} & C_{13} & C_{33} & & & \\ & & & C_{44} & & \\ & & & & C_{44} & \\ & & & & & C_{66} \end{pmatrix} \tag{8}$$

where $C_{12} = C_{11} - 2C_{66}$. Here, $C_{44}$ is the out-of-plane shear modulus, $C_{66}$ is the in-plane shear modulus, $C_{11}$ is the in-plane compressional modulus, $C_{33}$ is the out-of-plane compressional modulus, and $C_{13}$ is a parameter that controls the shape of the wave surfaces off the axis of symmetry. In examples, Thomsen's parameters may be defined in terms of $C_{ij}$:

$$\varepsilon = \frac{C_{11} - C_{33}}{2C_{33}} \tag{9}$$

$$\gamma = \frac{C_{66} - C_{55}}{2C_{55}} \tag{10}$$

$$\delta = \frac{(C_{13} + C_{55})^2 - (C_{33} - C_{55})^2}{2C_{33}(C_{33} - C_{55})} \tag{11}$$

Figure 6:
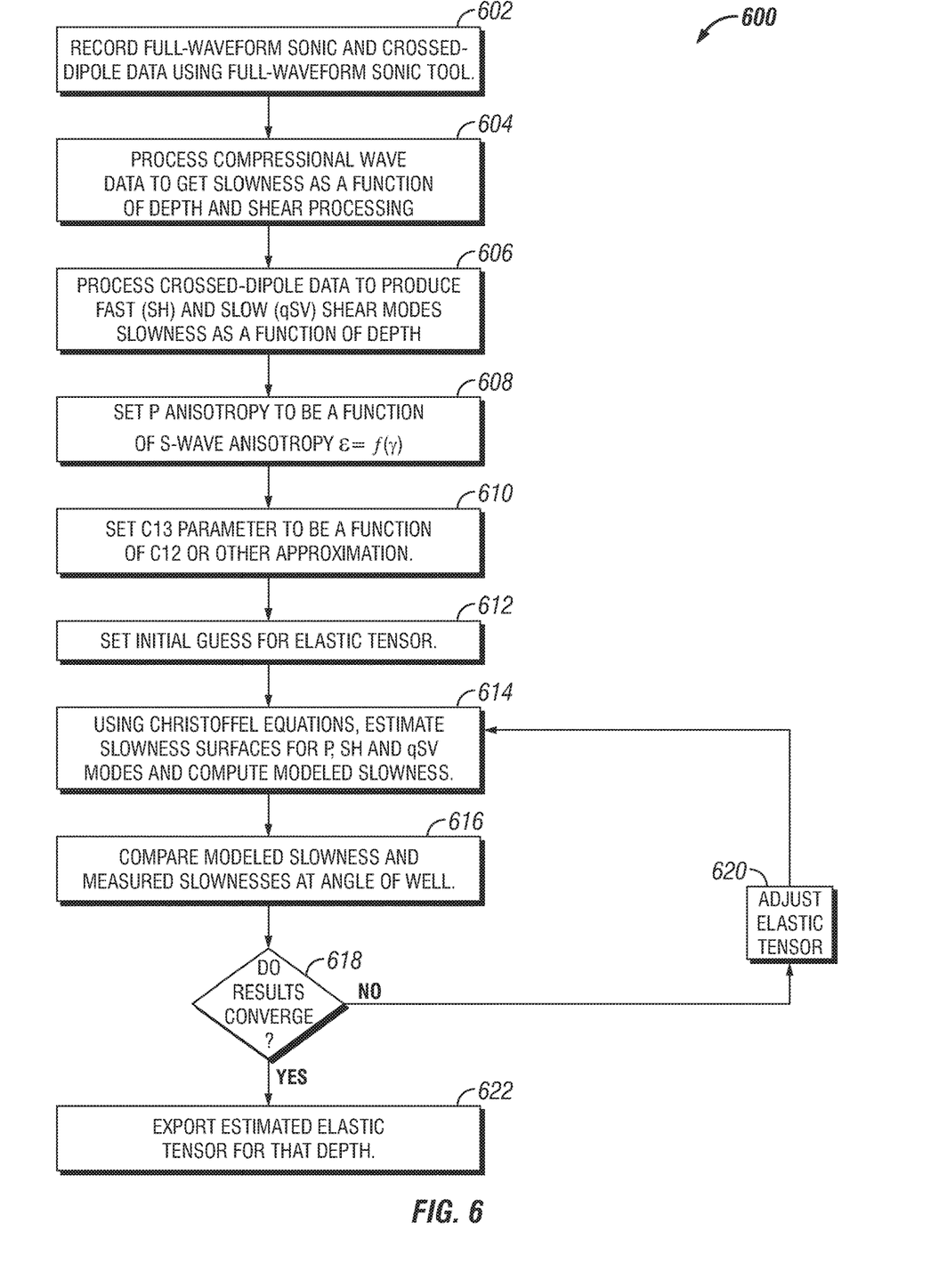
FIG. 6 illustrates a workflow for estimating a full elastic tensor for each measurement depth.

FIG. 6 illustrates a workflow for estimating a full elastic tensor for Transversely Isotropic media, at any depth. Workflow 600 may begin with block 602 in which full-waveform sonic and cross-dipole data are recorded using sonic logging tool 102 (e.g., referring to FIGS. 1 and 2). In block 604, the recorded compressional wave data is processed to produce P-wave slowness as a function of depth. Additionally, recorded XX and YY cross-dipole Flexural wave data is processed to produce XX and YY S-wave slownesses as a function of depth. To determine slowness from the recorded compressional wave data, a first motion detection and tracking method may be applied to locate a first arrival in a waveforms. If the first arrival is accurately, or successfully determined, a narrow 2-D semblance time window that spans the first arriving P-wave energy may be adopted. Although a Slowness Time Coherence ("STC") semblance method is mentioned, any semblance method may be employed, and may include point-to-point methods such as stacking or Differential Phase Time Semblance ("DPTS") within the narrow 2-D window or may also include time-window based methods such as STC or N-th root. Time semblance methods effectively average slowness over a narrow time window, which implicitly limits their slowness accuracy. This narrow time window provides a higher quality P-slowness estimation, as the first arriving P-waves are less affected by reflected and scattered waves. If the first motion detection technique fails to detect the first arrival, or inaccurately detects the first arrival, then the known slowness at neighboring formation depths near the transmitter may be used in an attempt to compute and predict the travel time of P-waves. In one or more embodiments, the processing may assume that sonic logging tool 102 (e.g., referring to FIGS. 1 and 2) is in an up-logging mode. The obtained travel time of P-waves provides a reliable starting time window for the semblance calculation. However, if the algorithm fails to provide a Travel Time (TT), a time window for the coherence processing may be used. However, the coherence map will be projected to the slowness axis, resulting in a 1-D coherence Variable Density Log (VDL). A 1D slowness labeling and tracking algorithm may then be used to pick the P-slowness from the 1D slowness coherence map. Finally, the P-slowness will be an output as the final answer for block 604. The P-slowness from block 604 is then transferred to block 606 for further processing.

Figure 7:
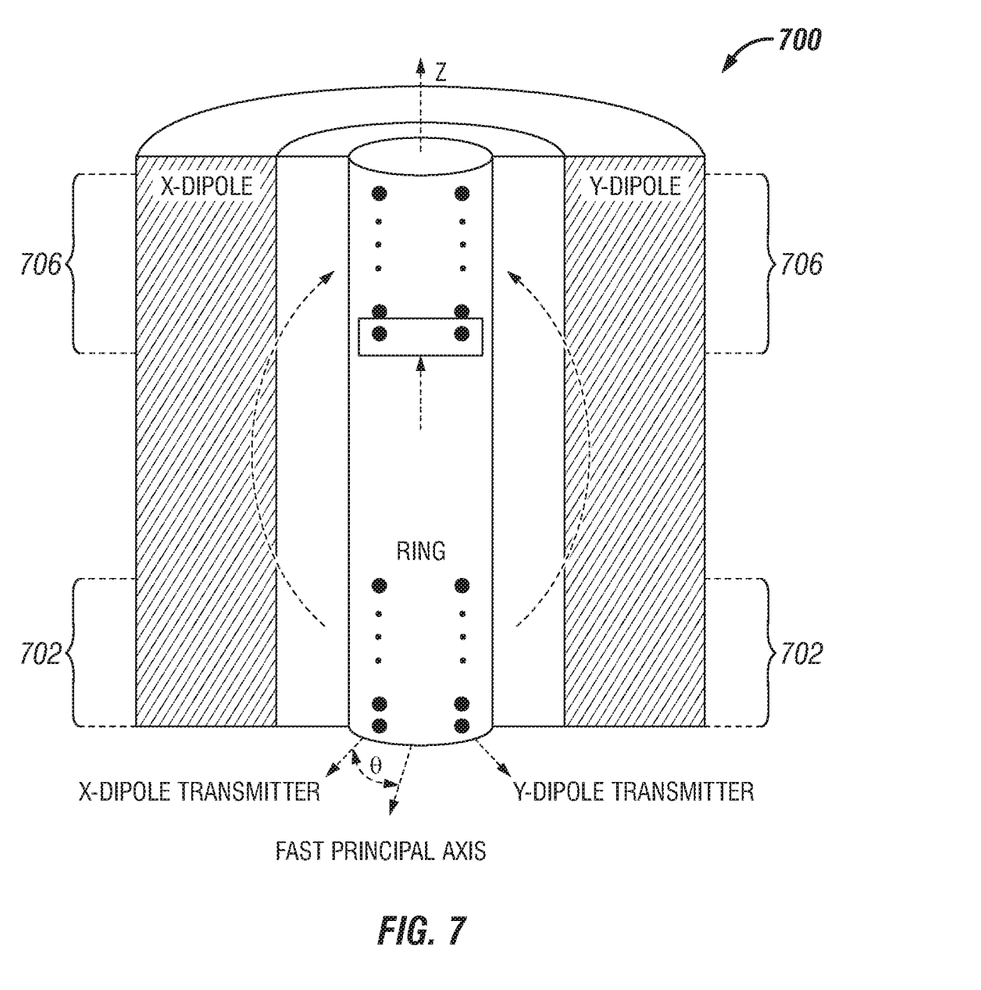
FIG. 7 illustrates an example of a cross-dipole acoustic tool.

In block 606 the cross-dipole data is processed to produce fast (SH) and slow (qSV) shear modes slownesses as a function of depth. Cross-dipole data is measured using an acoustic tool. FIG. 7 shows a cross-dipole acoustic tool 700, which may be a sonic logging tool 102 (e.g., referring to FIGS. 1 and 2), in a borehole aligned along the Z-axis that may be used in conjunction with the methods and systems described herein. For example, cross-dipole acoustic tool 700 includes two azimuthally orthogonal dipole-transmitter arrays 702 and two azimuthally orthogonal dipole-receiver arrays 706. Each array has at least one element aligned along the tool axis. Specifically, the recorded acoustic waveforms are denoted by in-line components, (XX, YY), and cross-line components, (XY, YX). The first letter refers to the transmitter, and the second letter to the receiver. Thus, for example, the XY recorded waveform is formed by firing the X-directed dipole transmitter and receiving at the Y-directed dipole receiver. The X and Y arrays are aligned along the Z-axis such that the m'th element of array X is at the same Z-position as the m'th element of array Y and is denoted as ring m. The fast principal wave axis of the formation is directed at angle θ relative to the x-axis. In examples, an Alford rotation equation assumes the waveforms transform as a second order tensor. Thus:

$$T^T X^j T = D^j \quad (12)$$

where $$T = \begin{bmatrix} \cos\theta & -\sin\theta \\ \sin\theta & \cos\theta \end{bmatrix} = \begin{bmatrix} c_\theta & -s_\theta \\ s_\theta & c_\theta \end{bmatrix} \quad (13)$$

$$X^j = \begin{bmatrix} XX_j & XY_j \\ YX_j & YY_j \end{bmatrix} \quad (14)$$

$$D_j = \begin{bmatrix} FP_j & 0 \\ 0 & SP_j \end{bmatrix} \quad (15)$$

$XX_j$, $YY_j$, $XY_j$, and $YX_j$, are the in-line and cross-line waveforms from transmitter ring m to receiver ring n, which is represented as a data point j={m, n, t or ω}. In examples, $FP_j$, and $SP_j$, are the fast and slow principal waves. The fast principal axis is at angle θ relative to the x-axis. Written explicitly the elements of equation (12) are:

$$(1,1) \to c_\theta^2 XX_j + s_\theta^2 YY_j + s_\theta c_\theta (XY_j + YX_j) = FP_j \quad (16)$$

$$(2,2) \to c_\theta^2 YY_j + s_\theta^2 XX_j - s_\theta c_\theta (XY_j + YX_j) = SP_j \quad (17)$$

$$(1,2) \to c_\theta^2 XY_j - s_\theta^2 YX_j - s_\theta c_\theta (XX_j - YY_j) = 0 \quad (18)$$

$$(2,1) \to c_\theta^2 YX_j - s_\theta^2 XY_j - s_\theta c_\theta (XX_j - YY_j) = 0 \quad (19)$$

Figure 8:
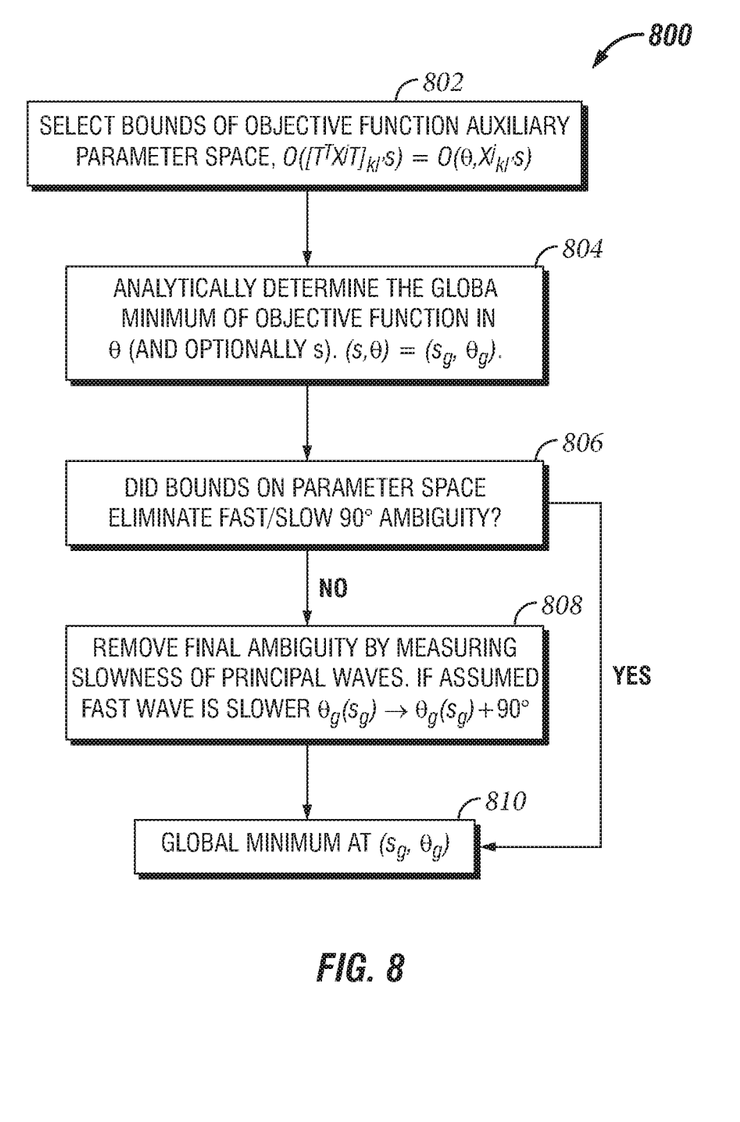
FIG. 8 illustrates a workflow for anisotropy processing

To process crossed-dipole data in block 606 (e.g., referring to FIG. 6), angle θ is solved for by determining a global minimum. Referring to FIG. 8, FIG. 8 illustrates a flow chart of workflow 800 for anisotropy processing according to various embodiments of the invention to find a global minimum. Workflow 800 may begin with block 802 in which anisotropy processing utilizes algorithms to solve for the angle θ by defining an objective function, $O([T^T X^j T]_{k1}, s)$, and minimizing the objective function with respect to (θ, s), where s is an auxiliary parameter space that defines the stacking of the points, j, used in the objective function and/or models the waveforms, $X^j$. Generally, s includes at least a slowness parameter, but may include other parameters such as borehole radius and formation density. In block 804, the minimization is performed using analytical methods, as described in more detail below. Often there are two minima to be resolved, separated by 90°, corresponding to the fast and slow principal axes.

It should be noted that many objective functions may be used, and corresponding equations derived and coded that follow the methods described herein. Moreover, it should be noted that in the description that follows, "defining an objective function" may comprise using a machine, such as a signal processor or a surface computer, to detect an input (e.g., perhaps provided by a user input device) and use the input to select one of a set of objective functions, and then to execute instructions corresponding to processing the equations corresponding to the selected objective function. Objective functions may also be defined by the machine, by detecting the format of an equation, and/or a set of environmental parameters, along with a desired output quantity, and using the format, the set of parameters, and/or the desired output quantity to select the function definition.

For example, a single transmitter ring, N receiver rings, and a single auxiliary parameter, slowness S, the objective function may be expressed in the form of Equations (20) and (21):

$$O(\theta, s) = \sum_{\substack{m \in \{1,\ldots,N\} \\ T_{ST} \le t \le T_{ST}+T}} [FP_{est}(\theta, t, s) - FP_m(\theta, t + sa_m)]^2 \quad (20)$$

$$FP_{est}(\theta, t, s) = \frac{1}{N} \sum_n FP_n(\theta, t + sz_n) \quad (21)$$

In Equations (20) and (21), $T_{ST}$ the start time of the flexural mode waveform at mid-array, and $Z_m$ is the position of receiver ring m relative to mid-array. This objective function simply computes the variance of the (1,1) element of Equations (16)-(19). For the correct choice of the angle θ, the waveform FP will travel at the slowness of the fast principal flexural wave, s, and the waveforms at each receiver, FP, will be stationary for $s=s_1$. At this point, the output of block 804, the objective function (variance) will be a minimum. In block 806, the objective function will also be a minimum at 0+90° for $s=s_2$, the slowness of the slow principal wave. In block 806, if ambiguity has been eliminated then workflow 800 ends by moving to block 810. However, in block 806, if ambiguity still exists, then intermediate values are reviewed. In examples, intermediate values of the angle the waveform will be a mixture of the fast and slow principal waves, $FP_m$, which will not be stationary for any value of s, and the objective function will not be a minimum, which leads to block 808. In block 808, the 90° ambiguity between the fast principal flexural wave and the slow principal flexural wave is removed by computing the objective function over a plurality of strike angles and slowness values. Then the ambiguity may be removed by comparing the slowness values of the two minima and setting the faster shear slowness to be the faster slowness and the slow shear slowness to be the slow slowness. The output of block 808 leads to block 810, where a global minimum is found, thus, solving for angle θ and completing processing of crossed-dipole data in block 606 (e.g., referring back to FIG. 6).

Referring back to FIG. 6, after processing cross-dipole data and reviewing it in workflow 800 (e.g., referring to FIG. 8), a starting value for $S_1$, from a slowness measurement from block 604, is utilized for one of the cross-dipole waveforms, XX or YY, or their average slowness, denoted by $S_{xxoryy}$. The value of $S_1$ is used to minimize the objective function $O(\theta_g (S_1, \delta s), s\&s)$ with respect to δs numerically. This gives a good initial estimate for θ and δs. Using the hyperbolic tangent equation:

$$s_1 = s_{xxoryy} - \frac{\delta s \left(1 + b \cdot \tanh\left[8\left(\frac{|\theta_g|}{90° - 0.5}\right)\right]\right)}{2} \quad (22)$$

where $$b = \begin{cases} +1 & \text{for } s_{xxoryy} = \text{slowness of } XX \\ -1 & \text{for } s_{xxoryy} = \text{slowness of } YY \\ 0 & \text{for } s_{xxoryy} = \text{average of } XX \text{ and } YY \text{ slowness} \end{cases} \quad (23)$$

to estimate a new value of $S_1$. This process is repeated until $S_1$ converges to some desired degree, which may process rapidly (sometimes within a single iteration) as the initial estimates of $\theta$ and $\delta s$ may be accurate.

In another example, processing the cross-dipole data may be performed by selecting a starting value for $S_1$ from a slowness measurement from block 604 for one of the cross-dipole waveforms, XX or YY, or their average slowness. In examples, the objective function O ($\theta_g$ ($S_1$, $\delta s$), $S_1$, $\delta s$) is minimized with respect to $\delta s$ numerically, at the selected starting value of $S_1$. Next, a sparse grid in s is defined to contain the initial value of $S_1$. Starting with this value of $S_1$ on the grid, a numerical search to find the minimum with respect to $\delta s$ using the initial $\delta s$ value as an initial guess is performed using values neighboring $S_1$. This method is repeated for the next neighbors on the grid using the last values of $\delta s$ as the initial guess. Using the values for the objective function, $S_1$, the angle, and $\delta s$ on the grid to find the value of all parameters at the global minimum of the objective function by low order interpolation. This analytic angle minimization method may be applied to other formulations of the objective function as well. For example, objective functions that include ratios of squares may be analytically minimized with respect to angle, producing similar equations, and following the same procedure. Even more exotic objective functions may be used, but these increase the complexity of the polynomial, and correspondingly, the execution time. The algorithm may be applied to an objective function in the frequency domain with a summation over bandwidth instead of time. Finally, an inversion over all receiver pairs may be accomplished using phase shifts, ending the cross-dipole data process in block 606, which produces three sets of slowness data values.

The three sets of slowness data values produced from block 606 are P-wave, SH, and qSV mode slownesses. However, a full elastic tensor for Transversely Isotropic media has five parameters. The three sets of measured slowness data, found in block 606, are by themselves not sufficient to invert for the full elastic tensor. To reduce the number of unknown parameters to three, approximations may be used in block 608 to set two of the elastic constants to be a function of one or more of the other three elastic constants. In block 608, the P-wave anisotropy is set as a function of S-wave anisotropy as:

$$\varepsilon = f(\gamma) \quad (24)$$

which may be, for example:

$$\varepsilon = a^*\gamma \quad (25)$$

where the adjustable parameter a may be calibrated using laboratory determination of the full elastic tensor using measurements on core acquired in the same well or an offset well, for example. Failing a core or other calibration, the following may be utilized instead:

$$\varepsilon = 1.0^*\gamma \quad (26)$$

for unconventional shales and $$\varepsilon = 0.5^*\gamma \quad (27)$$

for classic shale formations. Other approximations for unconventional shales and classic shale formations. Without limitation, approximations that may be utilized are Annie approximation, Modified Annie approximation, Gaussian approximations, self-consistent approximations, weak-anisotropy approximation, linear approximation, and/or the like may be used based on user's experience. In block 610, a Modified Annie approximation is utilized, where the $C_{13}$ parameter may be set to a function of the $C_{12}$ parameter or other approximation. For example:

$$C_{13} = b^*C_{12} \quad (28)$$

where $$C_{12} = C_{11} - 2C_{66} \quad (29)$$

and b is an adjustable parameter, normally calibrated by core measurements. This eliminates the $C_{13}$ parameter, as the $C_{12}$ parameter is derived from the already established parameters. Approximations from block 610 may be core calibrated, either from published data or (best) cores analyzed from same reservoir of interest, e.g. from a well data set. Failing any calibration, the Annie approximation:

$$C_{13} = C_{12} \quad (30)$$

may be used. From the approximations in blocks 608 and 610, an initial guess for the full elastic tensor is created in block 612. A number of possibilities exist for determining the initial guess and subsequent steps. One possibility is to simply take the rotated data, P, SH mode, and qSV mode, and first assume these modes represent data on the horizontal axis, as illustrated in FIG. 5. Therefore, it may be assumed measurement P is PH (horizontal), SV=qSV (as measured at actual relative well angle), and SH (90)=SH (as measured at actual relative well angle), referring to FIG. 5. Thus, initial estimates for shear elastic parameters $C_{44}$ and $C_{66}$ may be established. Shear anisotropy $\gamma$ is established by combining parameters $C_{44}$ and $C_{66}$, and P-wave anisotropy c is defined as discussed above in block 608. Next, the initial assumed PH (horizontal P-wave velocity) gives one P-wave elastic constant $C_{11}$, and estimated P-wave anisotropy c gives parameter $C_{33}$, which relates to the vertical P-wave velocity. The last parameter is $C_{13}$, which is approximated using expression defined in block 610. The results from these blocks may provide five parameters to proceed to block 614.

In block 614, using Christoffel equations, the slowness surfaces for P, SH, and qSV modes are estimated. The estimated slowness surfaces are the processed as modeled slownesses. These slowness surfaces may be estimated with the Christoffel equations using a simple phase slowness assumption or more accurately using a group velocity assumption. Application of the Christoffel equations gives theoretic slowness surfaces as shown in FIG. 5. In block 616, these may be compared with the actual log responses at the relative angle of the well (in this case 50 degrees) and a cost function computed from the differences. This cost function may be simply computed using, for example, the following equation:

$$C = \left(\frac{1}{N}\sum_1^N (\Delta t_l - \Delta t_m)^2\right)^{1/2} \quad (31)$$

where $\Delta t_l$ is slowness computed from the log measurements, $\Delta t_m$ is modeled slowness, which is taken from the modeled slowness surfaces at the relative dip angle at the depth level of question. In Equation (31), N is the total number of slowness measurements which are the three slowness measurements (P, SH and qSV slownesses), and C is the extracted cost function.

In block 618 the results are compared to see if the results converge. The test for convergence may be to determine if the computed cost function C is smaller than a pre-set value. This pre-set value may come from performing the algorithm of the cost function to determine the level of C in which no further gains in accuracy are obtained with further iterations. If it does not converge then the full elastic tensor is updated in in block 620. In block 620 each of the three elastic constants, $C_{11}$, $C_{44}$, and $C_{66}$, are individually and sequentially adjusted by a small amount both plus and minus (the small adjustment amount may be a percentage of the value of the elastic constant which is determined by trial and error, with a very small percent used in initial testing). Next, after perturbing any one of C11, C44, or C66, the elastic constants $C_{33}$ and $C_{13}$ are estimated as described above in block 614. After each individual perturbation, slowness surfaces may be recomputed for a new trial elastic tensor in block 616, as described above. From block 616, modeled and measured slownesses are compared to each other and the cost function is updated.

If the cost function C is reduced by any adjustment of any elastic constant, then that adjustment is kept, for each elastic constant. This process proceeds on an elastic constant by elastic constant basis. In one or more embodiments, the updated full elastic tensor (the 5 elastic constants) is put back into block 614 and re-computation of the modeled responses is be performed again for blocks 614-618 after each individual elastic constant is perturbed, as discussed above. Without limitation, any changes to any elastic parameter may reduce the total cost function.

To decide that the inversion is complete in block 618, criteria may be invoked on the minimum cost function desired, along with invoking a maximum number of iterations. An "iteration" is defined after individual updates are tested for each of the 3 elastic constants, C11, C44 and C66, and then convergence is tested. In examples, convergence may be tested for after each individual elastic constant is perturbed. By minimizing the cost function to a point where the modeled response matches the P, S, and qSV slownesses as extracted from the measured data, a desired accuracy may be found. From block 618, the estimated elastic tensor for that depth may be exported. Processing then proceeds with the next depth and so on as sonic logging tool 102 moves through wellbore 124 (e.g., referring to FIG. 1). In examples, measurements at each depth are taken and recorded, which may allow the above identified inversion process to be performed at each depth.

Using workflow 600 may allow for determining elastic anisotropy in wells with significant relative dip at each depth where measurements are recorded, and only using the individual measurements at each depth. Significant relative dip may range from 20 degrees, 30 degrees, or higher. In examples, determining a full elastic tensor from a single measurement may allow for the extraction of an equivalent vertical DTC and DTS curves for use with seismic calibration and a well tie, as well as for petrophysical analysis. Additionally, geomechanics answers may be improved based on the full elastic tensor calculated. Currently, there are no other methods that may estimate a full elastic tensor from a single well measurement on a depth by depth basis. Workflow 600 may work in any deviated well with deviation sufficient to show separated SH and SV shear modes in anisotropic sections (normally shale formations), normally greater than approximately 30 degrees relative angle. No additional well data may be required as processing in workflow 600 may operate and function on data acquired at single depth levels. Continuous results may be computed in virtually every deviated well. In other examples, at shallower relative dip angles, where shallower relative dip angels are between 1 degree and 20 degrees, a vertical well assumption may be made to estimate a full VTI elastic tensor. The vertical well assumptions may still be utilized for estimating VTI elastic properties, as described above, using flexural and Stoneley wave response that may work for near-vertical wells or wells with low relative dip between wellbore and bedding.

Statement 1: A method for estimating a full elastic tensor may comprise disposing a sonic logging tool into a wellbore, taking a measurement for compressional wave sonic data and cross-dipole shear data with the sonic logging tool at a first location as cross-dipole data, processing the compressional wave sonic data to produce a compressional wave slowness (P) and processing the cross-dipole shear data to produce a fast horizontal polarized shear wave slowness (SH) and a slow quazi-vertical shear wave slowness (qSV) as a function of depth, setting an initial guess for at least five constants of the full elastic tensor for Vertical Transversely Isotropy (VTI) symmetry, determining a modeled slowness surfaces from the full elastic tensor, and comparing the modeled slowness surfaces with measured values of the P, the SH, and the qSV.

Statement 2. The method of statement 1, further comprising adjusting the initial guess as a second guess for the full elastic tensor if a cost function derived from a comparison of the modeled slowness surfaces derived from the initial guess and the compressional wave sonic data and the cross-dipole shear data does not converge.

Statement 3. The method of statements 1 or 2, further comprising comparing the P, the SH and the qSV extracted from the modeled slowness surfaces at one or more relative dip angles of the wellbore with the P, the SH, and the qSV computed using the cross-dipole shear data and computing a cost function from differences of the modeled slowness and the cross-dipole shear data.

Statement 4. The method of statements 1-3, wherein the modeled slowness surfaces are found using a Christoffel equation.

Statement 5. The method of statements 1-4, wherein the cross-dipole data are full sonic waveforms.

Statement 6. The method of statement 5, further comprising processing the cross-dipole shear data to produce a fast shear mode and slow shear mode, wherein a fast shear slowness and a slow shear slowness are a function of depth.

Statement 7. The method of statement 6, further comprising setting P-anisotropy as a function of S-wave anisotropy.

Statement 8. The method of statement 7, further comprising setting $C_{13}$ parameter to be a function of a $C_{12}$ parameter.

Statement 9. The method of statements 1-5, wherein a cost function is used to compare the initial guess to the compressional wave and the cross-dipole shear data taken by the sonic logging tool.

Statement 10. The method of statements 1-5 or 9, further comprising moving the sonic logging tool to a second location in the wellbore and taking a second measurement.

Statement 11. A system may comprise a sonic logging tool, the sonic logging tool may comprise a transmitter configured to transmit one or more sound waves and a receiver configured to measure compressional wave sonic data and cross-dipole shear data. The sonic logging tool may further comprise an information handling system configured to process the compressional wave sonic data to produce a compressional wave slowness (P), process the cross-dipole shear data to produce a fast horizontal polarized shear wave slowness (SH) and a slow quazi-vertical shear wave slowness (qSV) as a function of depth, and set an initial guess for at least five constants of a full elastic tensor for Vertical Transversely Isotropy (VTI) symmetry. The information handling system may further be configured to determine a modeled slowness surfaces from the full elastic tensor and compare the modeled slowness surfaces with measured values of the P, the SH, and the qSV.

Statement 12. The system of statement 11, wherein the information handling system is further configured to adjust the initial guess as a second guess for the full elastic tensor if a cost function derived from a comparison of the modeled slowness surfaces derived from the initial guess and the compressional wave sonic data and the cross-dipole shear data does not converge.

Statement 13. The system of statement 11 or 12, wherein the information handling system is further configured to compare the P, the SH and the qSV extracted from the modeled slowness surfaces at one or more relative dip angles of a wellbore with the P, the SH, and the qSV computed using cross-dipole data analysis and computing a cost function from differences of the modeled slowness and the cross-dipole shear data.

Statement 14. The system of statements 11-13, wherein the modeled slowness surfaces are found using a Christoffel equation.

Statement 15. The system of statements 11-14, wherein the cross-dipole shear data are full sonic waveforms.

Statement 16. The system of statement 15, wherein the information handling system is further configured to process the cross-dipole shear data to produce a fast shear slowness and a slow shear slowness as a function of depth.

Statement 17. The system of statement 16, wherein the information handling system is further configured to set P-anisotropy as a function of S-wave anisotropy.

Statement 18. The system of statement 17, wherein the information handling system is further configured to set $C_{13}$ parameter to be a function of a $C_{12}$ parameter.

Statement 19. The system of statements 11-15, wherein a cost function is used to compare the initial guess to the compressional wave sonic data and the cross-dipole shear data taken by the sonic logging tool.

Statement 20. The system of statements 11-15 and 19, wherein the information handling system is further configured to instruct movement of the sonic logging tool to a second location in a wellbore and taking a second measurement.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for estimating a full elastic tensor comprising:
    disposing a sonic logging tool into a wellbore;
    taking a measurement for compressional wave sonic data and cross-dipole shear data with the sonic logging tool at a first location as cross-dipole data;
    processing the compressional wave sonic data to produce a compressional wave slowness (P) and processing the cross-dipole shear data to produce a fast horizontal polarized shear wave slowness (SH) and a slow quazi-vertical shear wave slowness (qSV) as a function of depth;
    setting an anisotropy function as a function of an SH-anisotropy, a qSV-anisotropy, or a combination of P- and qSV-anisotropy;
    setting an initial guess for at least five constants of the full elastic tensor for Vertical Transversely Isotropy (VTI) symmetry with at least the anisotropy function;
    determining a modeled slowness surfaces from the full elastic tensor; and
    comparing the modeled slowness surfaces with measured values of the P, the SH, and the qSV.

2. The method of claim 1, further comprising adjusting the initial guess as a second guess for the full elastic tensor if a cost function derived from a comparison of the modeled slowness surfaces derived from the initial guess and the compressional wave sonic data and the cross-dipole shear data does not converge.

3. The method of claim 1, further comprising comparing the P, the SH and the qSV extracted from the modeled slowness surfaces at one or more relative dip angles of the wellbore with the P, the SH, and the qSV computed using the cross-dipole shear data and computing a cost function from differences of the modeled slowness and the cross-dipole shear data.

4. The method of claim 1, wherein the modeled slowness surfaces are found using a Christoffel equation.

5. The method of claim 1, wherein the cross-dipole data are full sonic waveforms.

6. The method of claim 5, further comprising processing the cross-dipole shear data to produce a fast shear mode and slow shear mode, wherein a fast shear slowness and a slow shear slowness are a function of depth.

7. The method of claim 1, further comprising setting a $C_{13}$ parameter to be a function of a $C_{12}$ parameter.

8. The method of claim 1, wherein a cost function is used to compare the initial guess to the compressional wave and the cross-dipole shear data taken by the sonic logging tool.

9. The method of claim 1, further comprising moving the sonic logging tool to a second location in the wellbore and taking a second measurement.

10. A system comprising:
a sonic logging tool comprising:
a transmitter configured to transmit one or more sound waves; and
a receiver configured to measure compressional wave sonic data and cross-dipole shear data; and
an information handling system configured to:
process the compressional wave sonic data to produce a compressional wave slowness (P);
process the cross-dipole shear data to produce a fast horizontal polarized shear wave slowness (SH) and a slow quazi-vertical shear wave slowness (qSV) as a function of depth;
set an anisotropy function as a function of an SH-anisotropy, a qSV-anisotropy, or a combination of P- and qSV-anisotropy;
set an initial guess for at least five constants of a full elastic tensor for Vertical Transversely Isotropy (VTI) symmetry with at least the anisotropy function;
determine a modeled slowness surfaces from the full elastic tensor; and
compare the modeled slowness surfaces with measured values of the P, the SH, and the qSV.

11. The system of claim 10, wherein the information handling system is further configured to adjust the initial guess as a second guess for the full elastic tensor if a cost function derived from a comparison of the modeled slowness surfaces derived from the initial guess and the compressional wave sonic data and the cross-dipole shear data does not converge.

12. The system of claim 10, wherein the information handling system is further configured to compare the P, the SH and the qSV extracted from the modeled slowness surfaces at one or more relative dip angles of a wellbore with the P, the SH, and the qSV computed using cross-dipole data analysis and computing a cost function from differences of the modeled slowness and the cross-dipole shear data.

13. The system of claim 10, wherein the modeled slowness surfaces are found using a Christoffel equation.

14. The system of claim 10, wherein the cross-dipole shear data are full sonic waveforms.

15. The system of claim 14, wherein the information handling system is further configured to process the cross-dipole shear data to produce a fast shear slowness and a slow shear slowness as a function of depth.

16. The system of claim 10, wherein the information handling system is further configured to set a C13 parameter to be a function of a C12 parameter.

17. The system of claim 10, wherein a cost function is used to compare the initial guess to the compressional wave sonic data and the cross-dipole shear data taken by the sonic logging tool.

18. The system of claim 10, wherein the information handling system is further configured to instruct movement of the sonic logging tool to a second location in a wellbore and taking a second measurement.

* * * * *